(12) United States Patent
Eigemann et al.

(10) Patent No.: US 7,571,165 B2
(45) Date of Patent: Aug. 4, 2009

(54) METHOD AND SYSTEM FOR PROVIDING LOCKING BEHAVIOR

(75) Inventors: Sven-Eric Eigemann, Sandhausen (DE); Holger Bohle, Dielheim (DE); Jens Böckenhauer, Wiesloch (DE)

(73) Assignee: SAP AG, Walldorf (DE)

( * ) Notice: Subject to any disclaimer, the term of this patent is extended or adjusted under 35 U.S.C. 154(b) by 262 days.

(21) Appl. No.: 11/540,266

(22) Filed: Sep. 28, 2006

(65) Prior Publication Data
US 2008/0082534 A1    Apr. 3, 2008

(51) Int. Cl.
*G06F 17/30* (2006.01)
(52) U.S. Cl. ............................. 707/8; 707/3; 707/101; 707/200
(58) Field of Classification Search ................ 707/3, 707/8, 101, 200
See application file for complete search history.

(56) References Cited

U.S. PATENT DOCUMENTS

| | | | | |
|---|---|---|---|---|
| 5,809,527 | A * | 9/1998 | Cooper et al. ............... | 711/133 |
| 5,832,508 | A * | 11/1998 | Sherman et al. ............. | 707/200 |
| 5,835,764 | A * | 11/1998 | Platt et al. .................. | 718/101 |
| 6,023,706 | A * | 2/2000 | Schmuck et al. ............ | 707/200 |
| 6,101,508 | A * | 8/2000 | Wolff ......................... | 709/223 |
| 6,721,739 | B1 * | 4/2004 | Mende et al. ................. | 707/8 |
| 2003/0204534 | A1 * | 10/2003 | Hopeman et al. ........... | 707/200 |
| 2004/0133607 | A1 * | 7/2004 | Miloushev et al. .......... | 707/200 |
| 2004/0167932 | A1 * | 8/2004 | Edmonds .................... | 707/200 |
| 2004/0189439 | A1 * | 9/2004 | Cansino ..................... | 340/5.2 |
| 2005/0038834 | A1 * | 2/2005 | Souder et al. ............... | 707/203 |
| 2005/0246389 | A1 * | 11/2005 | Shah et al. .................. | 707/200 |
| 2006/0059205 | A1 * | 3/2006 | Shah et al. .................. | 707/200 |
| 2006/0101081 | A1 * | 5/2006 | Lin et al. .................... | 707/200 |
| 2007/0219999 | A1 * | 9/2007 | Richey et al. ................. | 707/8 |
| 2007/0288890 | A1 * | 12/2007 | Wells ......................... | 717/113 |

* cited by examiner

*Primary Examiner*—Don Wong
*Assistant Examiner*—Kim T Nguyen
(74) *Attorney, Agent, or Firm*—Kenyon & Kenyon LLP

(57) ABSTRACT

A method includes receiving by a first application an input from a user; performing a service by the second application, the service related to the input received by the first application; obtaining a log of all data locks set by the second application while performing the service, wherein the log indicates a data lock object and a data lock argument for each data lock set by the second application; and setting a generic lock having an associated generic lock object and a generic lock argument, wherein the generic lock argument indicates the data lock object and the data lock argument. In one embodiment, the a unique checksum is created, using an algorithm, for every service response.

24 Claims, 5 Drawing Sheets

METHOD AND SYSTEM FOR PROVIDING LOCKING BEHAVIOR

BACKGROUND INFORMATION

Services provided by a computing system may include any type of functionality provided by the system and may be implemented at least in part by software applications of the system. For example, a particular service may include a business functionality and may be implemented by an application which includes business logic to perform the business functionality. Generally speaking, legacy applications exist which have become outdated in some aspect, but which may still implement services which remain useful. For example, the user interface of a legacy application may have become outdated, but the service it implements may still be useful. One approach to using the services of legacy applications includes developing a new application which reuses the services of the legacy application but which updates the outdated aspects.

One problem associated with this approach is that it may be difficult to integrate the existing locking behavior of legacy applications into a locking behavior of a new application. Applications typically lock data, in some manner, while the data is being modified by a particular user in order to prevent a different user from accidentally modifying an incorrect version of the data. However, a new application which reuses a service of a legacy application may do so only intermittently, and thus locks set by the legacy application may not be sufficient in a temporal sense to provide locking behavior for a process of the new application. Thus, some type of new locking behavior associated with the new application may be desirable. Furthermore, it may be unknown exactly what type of locking behavior is implemented by the legacy application, and thus it may be desirable that any new locking behavior associated with the new application be developed, and be useable, without detailed knowledge of the locking behavior of the legacy application. Moreover, the locking behavior of legacy applications may not implement some aspects of data locking that have been developed in the interim between the development of the legacy application and the development of the new application. Thus, it may be desirable to provide a new locking behavior associated with a new application with an updated or different aspect than was implemented in the locking behavior of the legacy application.

BRIEF DESCRIPTION OF THE DRAWINGS

So that features of the present invention can be understood in detail, a description of the invention can be had by reference to embodiments, some of which are illustrated in the appended drawings. It is to be noted, however, that the appended drawings illustrate only particular embodiments of the invention and are therefore not to be considered limiting of its scope, for the invention may admit to other equally effective embodiments.

DETAILED DESCRIPTION

Figure 1:
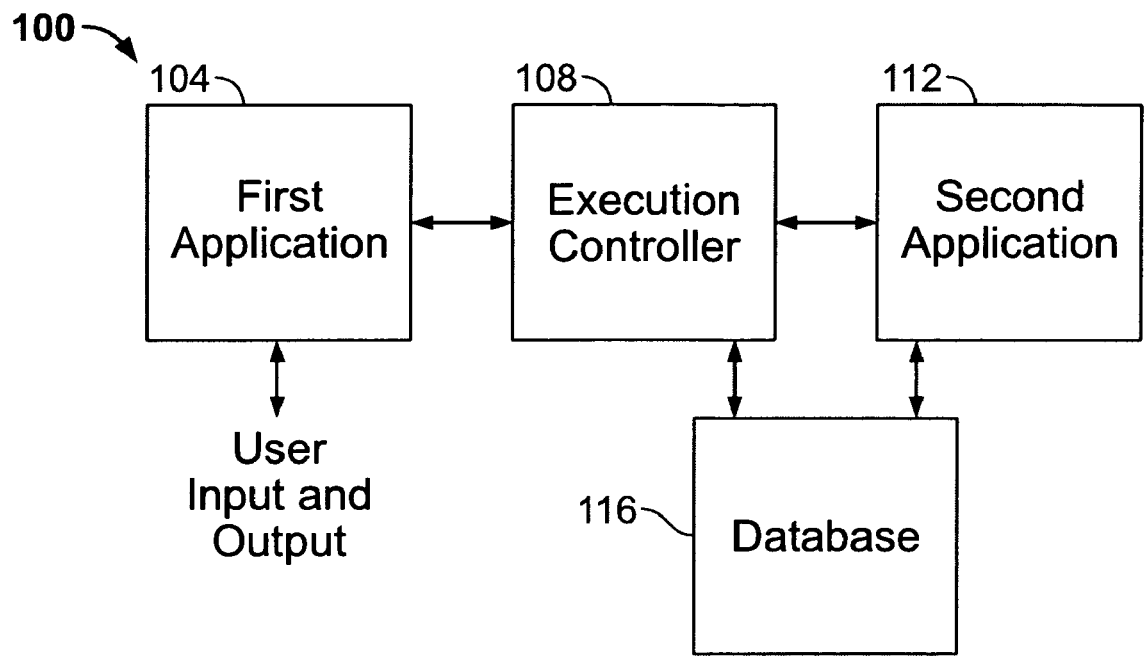
FIG. 1 is a schematic diagram depicting one embodiment of a software.

Embodiments are related to providing a generic locking behavior associated with a first application which utilizes a service performed by a second application. FIG. 1 depicts one embodiment of a software 100. The exemplary embodiment of the software 100 depicted in FIG. 1 comprises a first application 104, an execution controller 108 and a second application 112. The first application 104 is capable of receiving an input from a user, and communicating with the execution controller 108. The execution controller 108 is capable of communicating with both the first application 104 and the second application 112. The second application 112 is capable of performing a service. The performing of the service by the second application optionally includes accessing the database 116. In one embodiment, the execution controller 108 is also capable of accessing the database 116. In one embodiment, the first application 104 is a relatively newer application and the second application 112 is a relatively older application, i.e., a legacy application. For example, the first application 104 can be developed to update some undesirable or outmoded aspect of the second application 112. In one embodiment, the first application 104 provides a user interface that is updated relative to a user interface of the second application 112. Other embodiments of the software 100 also exist.

In one embodiment, the software 100 depicted in FIG. 1 corresponds to the software architecture described in U.S. patent application Ser. No. 11/441,463, to Stefan Elfner et al., filed Apr. 25, 2006, entitled "Mapping a New User Interface onto an Existing User Interface," which is hereby incorporated by reference in its entirety.

Figure 2:
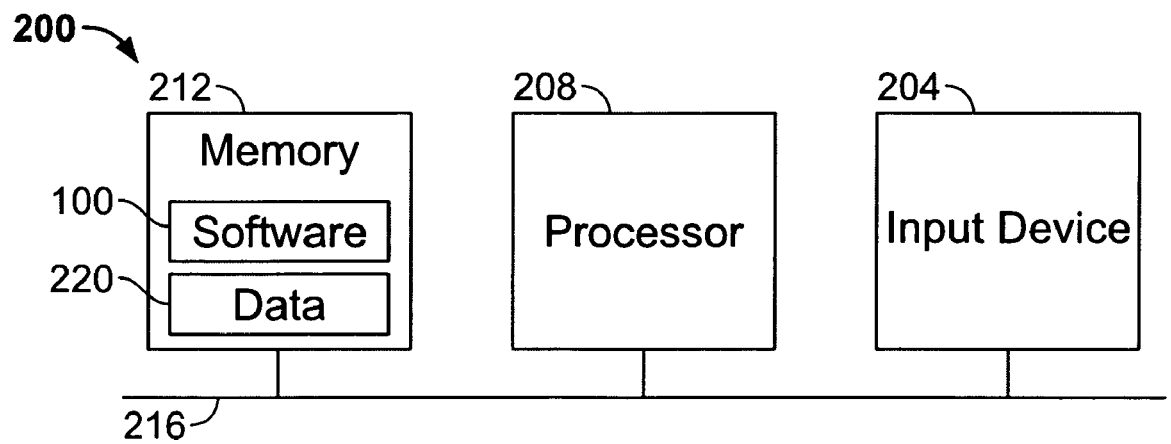
FIG. 2 is a schematic diagram depicting one embodiment of a computing environment.

The software 100 depicted in FIG. 1 runs in, and is part of, a computing environment 200. FIG. 2 depicts an exemplary embodiment of the computing environment 200. The computing environment 200 comprises an input device 204, a processor 208, a memory 212 and a communication line 216. The memory 212 further comprises data 220 and the software 100, which are stored in the memory 212 at least at some moment in time. The input device 204 optionally comprises at least one of: a keyboard, a mouse, a voice activated controller, an optical controller, an infrared controller, or other suitable input device. The memory 212 optionally comprises at least one of: a random access memory, a disk storage memory, or other suitable memory. The software 100 comprises computer program instructions which may be accessed and executed by the processor 208. The software 100 is implemented in any suitable software language such as, for example, Java, C, C++, etc. The data 220 optionally comprises data which accessible by or integral to the database 116.

The memory 212, processor 208 and input device 204 are connected together, and communicate with each other, by means of the communication line 216. In one embodiment, the communication line 216 comprises a system bus, and the computing environment 200 comprises a single computer. In another embodiment, the communication line 216 comprises a network element, and the computing environment 200 comprises a distributed computing environment. In one embodiment in which the computing environment 200 is distributed, the memory 212, processor 208 and input device 204 are optionally distributed across different locations. In one embodiment in which the computing environment 200 is distributed, the computing environment 200 optionally comprises a plurality of some or all of the memory 212, the processor 208 and the input device 204. Other configurations of the computing environment 200 are also possible.

Figure 3:
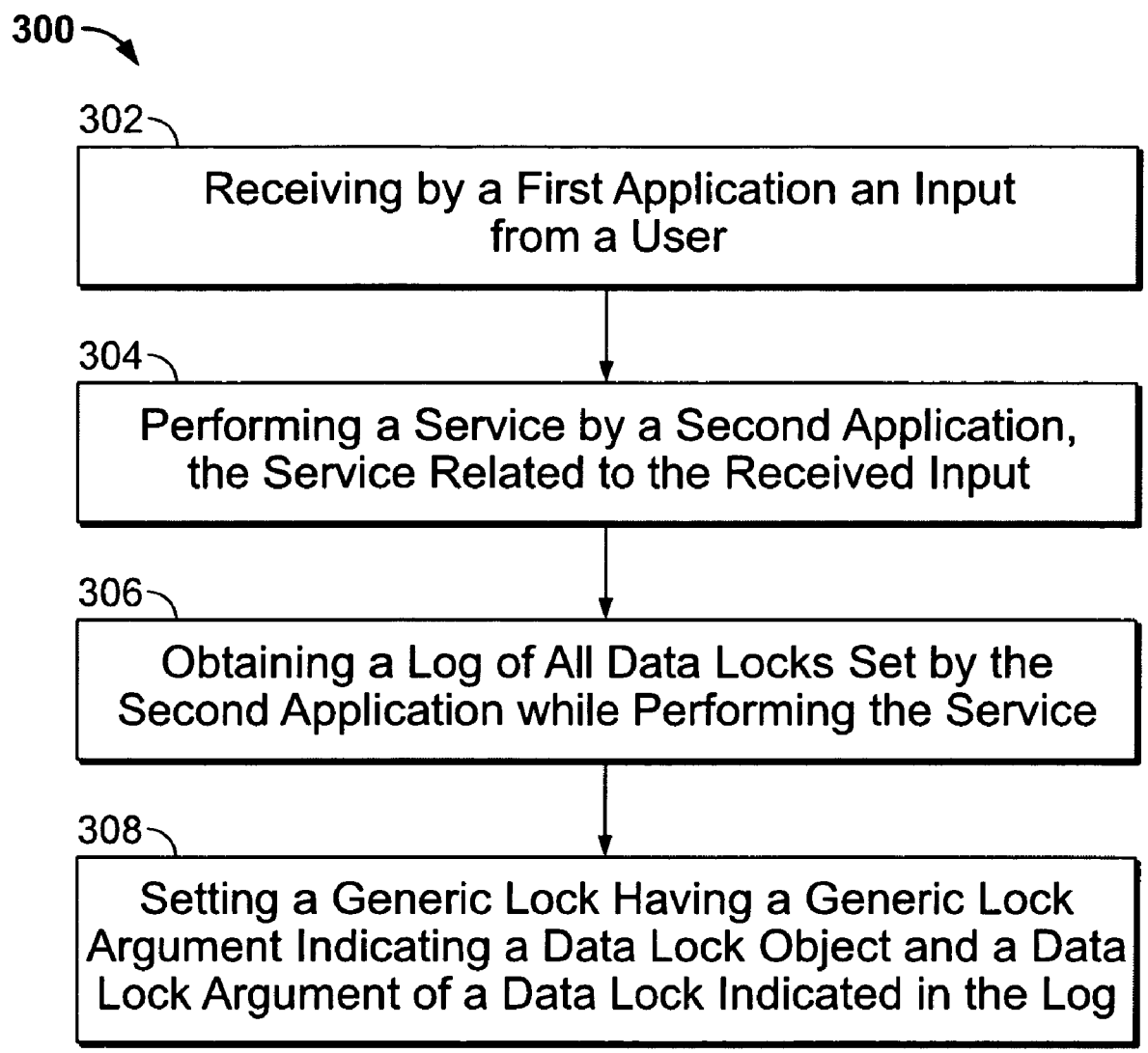
FIG. 3 is a flow chart depicting a schematic representation of one embodiment of a method.

FIG. 3 depicts a schematic representation of one embodiment of a method 300. The method of FIG. 3 is merely one way of carrying out the various embodiments described herein, since variations of the embodiment of the method 300 depicted in FIG. 3 are possible.

Figure 4:
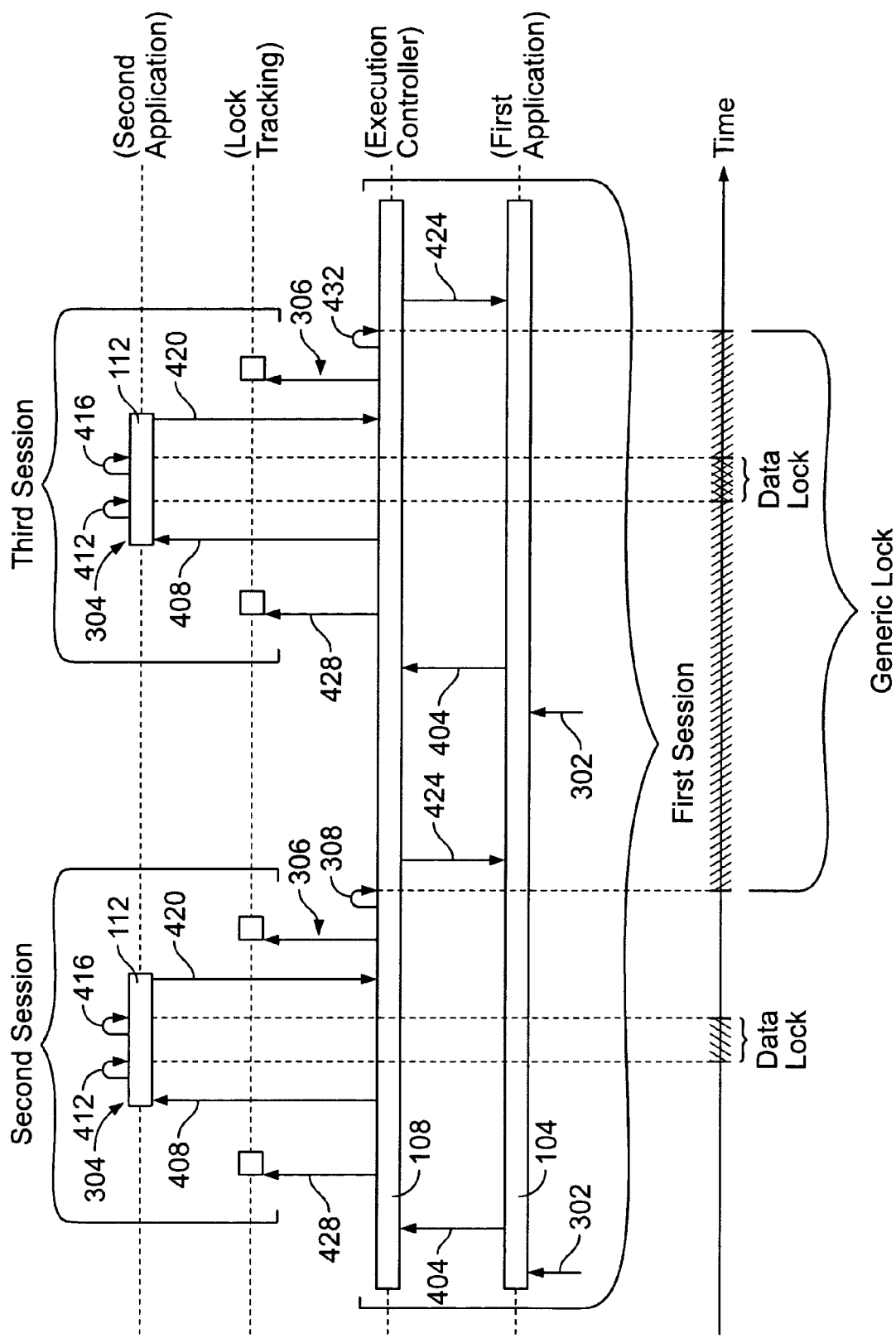
FIG. 4 is a flow diagram depicting another schematic representation of one embodiment of the method depicted in FIG. 3.

Additionally, FIG. 4 depicts another schematic representation of one embodiment of the method 300 depicted in FIG. 3. The schematic representation FIG. 4 may be useful to further understand embodiments of the method 300 depicted in FIG. 3, and contains additional visual elements, such as arranging the various steps of the method 300 according to a time axis, and also visually organizing elements of the method 300 discussed below.

In one embodiment, as depicted in FIG. 1, the method 300 begins at step 302. At step 302, an input from the user is received at the first application 104. The receiving in step 302 optionally comprises the user entering the input using the input device 204. For example, in one embodiment, the first application 104 comprises a graphical user interface, and the user enters the input by manipulating elements of the graphical user interface. In one embodiment, the first application 104 is capable of individually assuming a plurality of different states, each state comprising a specific visual configuration of the graphical user interface, including the visual arrangement of graphical elements and specific data displayed by the state. The received input optionally changes the state of the first application 104. The receiving in step 302 may also comprise receiving alphanumerical data from the user, or receiving a command from the user. In one embodiment, the first application 104 does not comprise business logic related to implementing a service.

In one embodiment of the method 300, step 304 is performed after step 302. At step 304, a service is performed by the second application 112. The service can include any type of functionality capable of being provided by the second application 112 running in the computing environment 200. For example, in one embodiment the service comprises some type of business functionality. Many different types of business functionalities are envisioned, including, for example, interacting with customers or clients, maintaining employee data, etc. Exemplary business services include generating a customer order for a product, changing the customer order, deleting the customer order, etc. Other types of services are also possible, including services that are not related to businesses. In one embodiment, the second application 112 comprises logic which defines rules for performing the service. For example, the second application 112 optionally comprises business logic which defines the rules for performing a service related to business functionality.

In one embodiment, the service performed by the second application 112 comprises accessing the database 116. The database 116 optionally comprises both data and computer program instructions. Accessing the database 116 by a component of the software 100 typically comprises forming a communication link between the component and the database 116. The communication link, which has a particular duration over time, between the component and the database 116 is known as a session. A particular session is usually associated with a particular user. Different embodiments of sessions are possible. For example, in one embodiment, a particular session comprises a communication link between the second application 112 and the database 116. In another embodiment, a particular session comprises a communication link between the execution controller 108 and the database 116. In one embodiment, the database 116 comprises components that provide a server functionality, and the execution controller 108 and the second application 112 each comprise components that provide a client functionality relative to the server functionality. In such a client-server embodiment, the communication link of the session comprises a link between a server and a client.

In one embodiment of the method 300, the first application 104 is associated with a first session and the second application 112 is associated with a second session. The first and second sessions are both associated with the user. In one embodiment, the first session comprises a first communication link involving the execution controller 108, and the second session comprises a second communication link involving the second application 112, the second communication link being a different communication link than the first communication link. In one embodiment, the first session comprises a first communication link involving the execution controller 108 and the database 116, and the second session comprises a second communication link involving the second application 112 and the database 116, the second communication link being a different communication link than the first communication link. In one embodiment, the first session comprises a first communication link involving the execution controller 108 and a server, and the second session comprises a second communication link involving the second application 112 and a server, the second communication link being a different communication link than the first communication link. In one embodiment, the server may be regarded as part of the database 116.

In one embodiment, the performing of the service in step 304 comprises executing a plurality of commands by the second application 112 to perform the service. The service is related to the input received by the first application 104, but is not limited to a one-to-one correspondence between input commands received by the first application 104 and commands executed by the second application 112 to perform the service. For example, the input received by the first application 104 may comprise a single input command, such as for example, save, print, or modify, etc., but the performing of the related service by the second application 112 may comprise executing a plurality of commands.

In one embodiment in which the method 300 is implemented using the software 100 depicted in FIG. 1, the execution controller 108 acts as an intermediary between the first application 104 and the second application 108. For example, in one embodiment, the method 300 comprises the first application 104 invoking the service (see step 404 in FIG. 4) from the second application 112 through the execution controller 108. The invoking 404 of the service through the execution controller 108 is in response to the receiving in step 302. That is, the first application 104 receives the input from the user and communicates information related to the input to the execution controller 108 to invoke 404 the service from the second application 112. The execution controller 108 then requests 408 the service from the second application 112 in response to the invoking 404.

The performing of the service in step 304 comprises setting 412 at least one data lock by the second application 112. Data locks are typically set by applications to synchronize access to data for a plurality of users. For example, data locks can prevent different users from accidentally modifying an incorrect version of data, or to prevent multiple users from modifying the same data at the same time. For example, a data lock can deny write access to specific data for a second user while a first user (i.e. the user discussed thus far) is granted write access to the specific data. During the performing of step 304, the at least one data lock is set 412 by the second application 112 to prevent other users (e.g. the second user) from modifying at least some of the data involved in the performing of the service at step 304. The setting 412 of the data lock also grants the first user write access to the specific data. Upon completing the performance of the service by the second application at step 304, the at least one data lock that was set during the performance of the service is deleted 416.

In one embodiment, the data locks set 412 by the second application 112 are at least partially implemented by the database 116. In one embodiment, the data locks set 412 by the second application 112 are at least partially implemented by a server in communication with the second application 112. For example, in one embodiment, the data locks set 412 by the second application 112 are at least partially implemented by a server functionality that is part of the database 116. In one embodiment, setting 412 of data locks comprises storing information in a memory location globally accessible to relevant portions of the software 100 that may potentially be modifying the data.

A specific data lock set 412 by the second application 112 involves a data lock object and a data lock argument. The data lock object indicates a portion of the data 220 that may be involved in the data locking. In one embodiment, the data lock object indicates a database table. In another embodiment, the data lock object indicates both the database table and a key field of the database table. The data lock object can optionally indicate a plurality of database tables. The data lock object can also optionally indicate a plurality of key fields of the database table. The data lock argument indicates specific data locked by the data locking functionality. In one embodiment, the data lock argument indicates a specific value of a key field of the database table, and thus, in such an embodiment, the data lock argument indicates which subset of the rows of the database table, specified by the data lock object, are to be locked. In one embodiment, the specific value of the data lock argument is a specific value of the key field indicated by the data lock object. In another embodiment, the specific value of the data lock argument is a value of a primary key field that is known to the database 116, but not necessarily indicated by the data lock object.

The performing of the service in step 304 returns 420 a first result by the second application 112 to the execution controller 108. In one embodiment, the execution controller 108 returns 424 a second result, based on the first result, to the first application 104. In another embodiment, the first and second results comprises output data.

In one embodiment of the method 300, step 306 is performed after step 304. At step 306, a log is obtained of all data locks set 412 by the second application 112 during the performing of the service at step 304. For each data lock set 412 by the second application 112, the log indicates the corresponding data lock object and data lock argument. At step 306, the method 300 obtains at least one specific data lock object and at least one specific data lock argument related to at least one specific data lock that was set 412 by the second application 112 during the performing of the service at step 304. In one embodiment, the method 300 obtains a plurality of specific data lock objects and a plurality of specific data lock arguments of a corresponding plurality of specific data locks that were set 412 by the second application 112 during the performing of the service at step 304.

In one embodiment in which the method 300 is implemented using the software 100 depicted in FIG. 1, the method 300 comprises enabling 428, by the execution controller 108, tracking of the data locks set 412 by the second application 112. The enabling 428 by the execution controller 108 is in response to the invoking 404 of the service by the first application 104; and the requesting 408, by the execution controller 108, of the service from the second application 112 is performed after the enabling 428 of the tracking of data locks. In one embodiment, the enabling 428 of the tracking of data locks is performed by the execution controller 108. In one embodiment, the enabling 428 of the tracking of data locks is performed by the execution controller 108 in combination with a global resource available to the software 100 in the computing environment 200, such as a server with which components of the software 100 are capable of communicating. For example, in one embodiment, the enabling 428 comprises the execution controller 108 communicating with a software component of a server managing data locks. In one embodiment, such a server can be considered as a part of the database 116.

In one embodiment of the method 300, step 308 is performed after step 306. At step 308, a generic lock is set. The generic lock provides a generic locking behavior for a process conducted by the first application 104 appropriate to, for example, the context of the first application 104 using services provided by the second application 112. The generic locking accommodates intermittent use of the services of the second application 112 and its data locking behavior. In one embodiment, the generic locking behavior can also provide locking behavior functionality which is enhanced or different relative to the data locking behavior of the second application 112.

The generic lock has an associated generic lock object and a generic lock argument. The generic lock is more general than the data lock and can lock different types of functionalities. The generic lock object indicates a type of the generic locking functionality. For example, in one embodiment, the generic lock object indicates that the generic lock object locks against the use of data locks. The generic lock argument indicates a specific target of the generic locking functionality. For example, in one embodiment, the generic lock argument indicates a specific data lock to lock. In the method 300, the value of the generic lock argument of the generic lock set during the setting at step 308 indicates the specific data lock object and the specific data lock argument of the at least one specific data lock obtained from the log of data locks at step 306. In one embodiment, the setting of step 308 sets a generic lock corresponding to at least one data lock set 412 by the second application 112 during the performing of the service at step 304. In one embodiment, the setting of step 308 sets a generic lock for each data lock set 412 by the second application 112 during the performing of the service at step 304.

One functionality of the generic lock is to prevent the setting of other data locks having the specific data lock object and the specific data lock argument, obtained from the log at step 306, by other users while the first user is conducting an ongoing process in the first application 104. For example, in one embodiment, the first application 104 individually invokes 404 a plurality of services from the second application 112 over a period of time, and the second application 112 is used in an effectively stateless manner. Using the second application in an effectively stateless manner comprises: initiating an instance of the second application 112 in response to a service request 408 (e.g., thus also in response to the invoking 404 of the service by the first application 104 through the execution controller 108), executing all commands within the second application 112 necessary to perform the service, and then terminating the instance of the second application 112 before responding to any other service requests (i.e., additional invocations 404 of services of the second application 112 by the first application 104 through the execution controller 108). Thus, when used in an effectively stateless manner, the second application 112 initiates, performs a service, and then terminates relatively quickly. It is not kept running once the service has been performed. Without the generic locking provided by the method 300, invoking 404 a plurality of services of the second application 112 individually over a period of time would result in undesirable gaps in data locking provided by the second application 112 between the individual performances of the services when the second application 112 is not running. During these gaps, during which the data locking provided by the second application 112 would be inactive, a second user, without the generic locking provided by the method 300, could undesirably modify data involved in the ongoing process being conducted by the first user via the first application 104.

The generic locking provided by the method 300 provides a solution for these undesirable gaps in data locking coverage. The generic locking provides locking behavior to the combined use of the first application 104 and the second application 112 that prevents the second user from undesirably modifying the data during the ongoing process being conducted by the first user. The generic lock is able to perform this functionality in part because the generic lock argument indicates the specific data lock and specific data lock argument obtained from the data lock log at step 306, and as such is able to prevent other users from setting data locks having this specific data lock object and specific data lock argument.

The functionality of the generic data lock may be further understood through the use of the following pseudocode. For example, in one embodiment, the following data lock is set by the second application 112 during the performing of the service at step 304:

object_1 (argument_1).

In the example, the setting at step 308 would then set the following generic lock:

object_2 (object_1, argument_1).

Thus, in the example, argument_2 indicates both object_1 and argument_1. In this way, the setting of the generic lock locks against another user using the specific data lock obtained from the data lock log at step 306.

In one embodiment, the setting of the generic lock is performed by the execution controller 108. In another embodiment, the setting of the generic lock is performed by the execution controller 108 in combination with a global resource available to the software 100 in the computing environment 200, such as a server with which applications of the software 100 are capable of communicating. For example, in one embodiment, the setting of the generic lock comprises the execution controller 108 communicating with a server managing data locks. Such a server can be considered as a part of the database 116. In another embodiment, the setting of the generic lock is indicated in a memory accessible by all instances of the first application 104 running in any session, and in one version of such an embodiment, the memory comprises a random access memory.

In one embodiment in which the method 300 is implemented using the software 100 depicted in FIG. 1, the first application 104 and the execution controller 108 are associated with the first session, and the second application 112 and at least part of the lock tracking are associated with the second session. This exemplary delineation of instances of software applications and tasks between the first and second sessions can be further understood by the graphical depiction of FIG. 4. As depicted in FIG. 4, the first application 104 runs, receives the input at step 302, and invokes 404 the service through the execution controller 108 in association with the first session. Additionally, the setting of generic locks of step 308 occurs in association with the first session, for example by the execution controller 108 as shown in FIG. 4. The second application 112 performs the service, and sets 412 data locks in association with a session different than the first session (i.e. the second session, a third session or other sessions). As is depicted in FIG. 4, in one embodiment, some aspect of the tracking of data locks occurs in association with the second session. Furthermore, for each separately invoked service, the second application 112 performs the service and sets data locks in association with different sessions.

For example, in the embodiment depicted in FIG. 4, two separate services are invoked 404 through the execution controller 108, one resulting in a performance of a particular service in association with a second session, and the other resulting in a performance of a particular service in association with a third session. As is depicted in FIG. 4, the second session ends before the third session begins. FIG. 4 also depicts graphically along the timeline the relative durations of the data locks set by the second application 112 in association with the second and third sessions, and the generic locks set in association with the first session. The generic lock can be seen in FIG. 4 to cover at least part of the interim between the second session and the third session. In one embodiment, this interim is part of an ongoing process related to the first application 104. Thus, in the embodiment of the method 300 depicted in FIG. 4, the first, second and third sessions are all associated with the first user, and the second and third sessions end before the first session. In the depicted embodiment, the method 300 further comprises deleting 416 the data lock set in the second session before deleting 432 the generic data lock, and setting 412 a second data lock in association with the third session before deleting 432 the generic data lock.

In one embodiment, the generic lock is an optimistic lock and the data lock set by the second application 112 is an exclusive data lock. One advantage to such an embodiment is that the generic locking behavior provided by the method 300 provides upgraded locking functionality relative to the data locking behavior of the second application 112. For example, the second application 112 is optionally a legacy application that only provides exclusive locking behavior, and it may be desirable to upgrade that behavior to provide optimistic locking behavior. An exclusive lock is associated with a specific user, grants write access to specific data for that specific user, and prevents other users from being granted write access to that specific data. An optimistic lock is also associated with a specific user, but grants a non-exclusive reservation on write access to the specific data for that specific user, and does not prevent other users from also being granted other non-exclusive reservations on write access to the specific data. An optimistic lock is capable of being converted to an exclusive lock for the specific user, at which point the converting cancels any other optimistic locks on the specific data associated with other users. In one embodiment, the second application 112 is not capable of setting optimistic locks, and the method 300 thereby associates optimistic locking behavior with the service performed by the second application.

Figure 5:
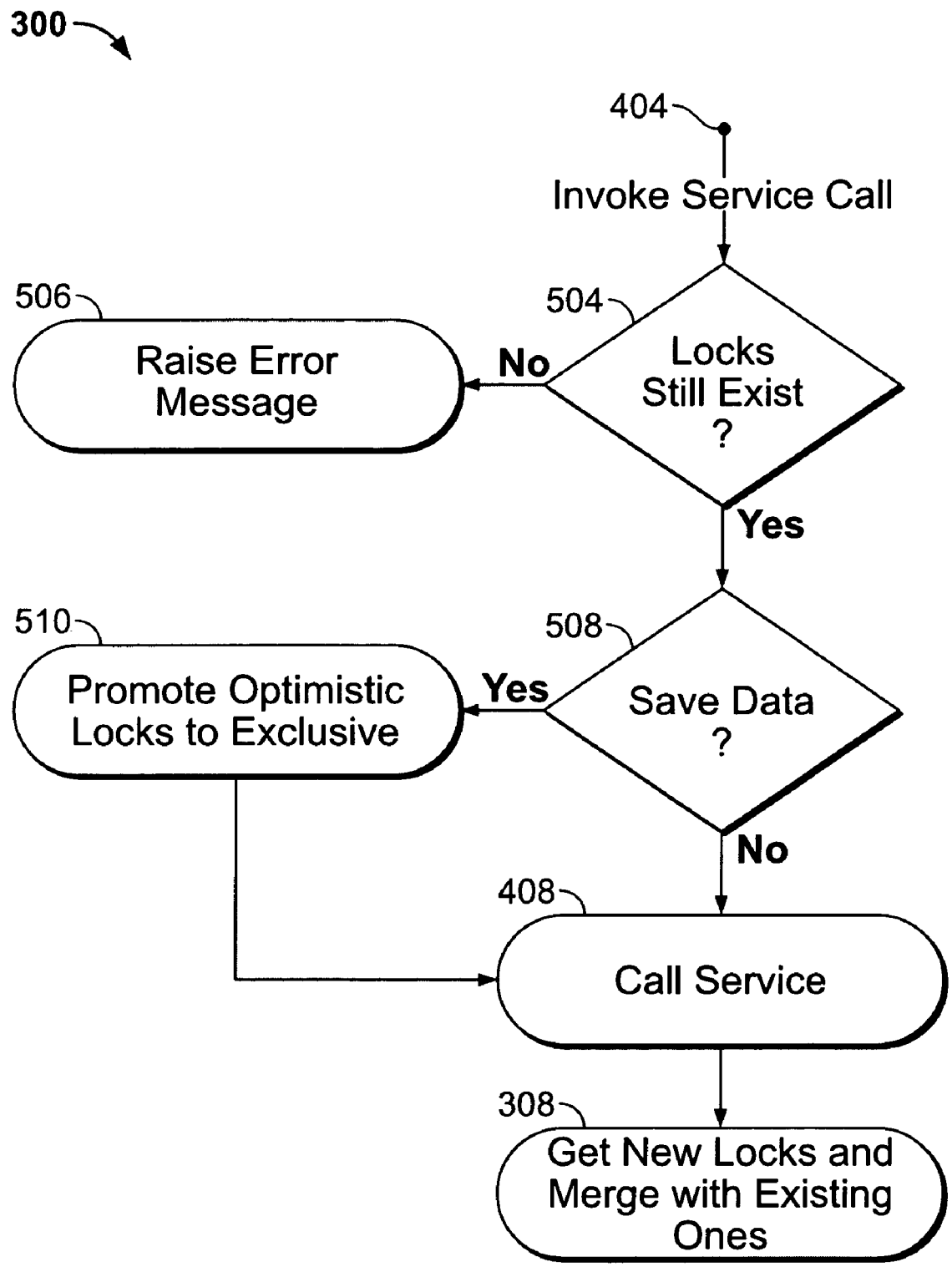
FIG. 5 is a flow chart depicting a schematic representation of at least part of one embodiment of the method depicted in FIG. 3, the embodiment of the method depicted in FIG. 5 including providing optimistic generic locking behavior.

FIG. 5 depicts one scenario involving at least part of an embodiment of the method 300 in which the generic locks which are set by the method 300 are optimistic locks. The embodiment of the part of the method 300 depicted in FIG. 5 may overlap parts of the embodiment of the method 300 depicted in FIG. 3, and provide more detail in some aspects. As depicted in FIG. 5, at step 404 a service from the second application 112 is invoked through the execution controller 108 by the first application 104 for the first user. The scenario depicted in FIG. 5 accommodates the possibility that the first application 104 has previously invoked other services through the execution controller 108 as part of an ongoing process for the first user, and that optimistic locks may have been previously set in relation to the ongoing process. The depicted embodiment of the method 300 performs step 504 after step 404. At step 504, the execution controller 108 checks to make sure that all previously set optimistic locks associated with the ongoing process in the first application 104 are still available as optimistic locks to the ongoing process. If not, that means that some other process, possibly involving another user, has converted one of the previously set optimistic locks to an exclusive lock, and the optimistic lock previously set by the method 300 for the first user has been lost. In such an event, not all of the previously set optimistic locks still exist and the depicted embodiment of the method 300 proceeds to step 506 and raises an error message alerting the first user.

If all the previously set optimistic locks still exist, the depicted embodiment of the method 300 proceeds to step 508. At step 508, the execution controller 108 determines if the service invoked at step 404 involves saving data. If it does, the depicted embodiment of the method 300 proceeds to step 510. At step 510, the method 300 promotes the optimistic generic locks associated with the data to be saved to exclusive generic locks. This will also cancel any other optimistic generic locks associated with the specific data that may have been set by other users, such as by other users also using the first application 104. The depicted embodiment of the method 300 proceeds to step 408 after steps 510, and also upon a negative determination at step 508. At step 408, the execution controller 108 requests the service from the second application 112 which was invoked by the first application 104 at step 404. The depicted embodiment of the method 300 proceeds to step 308 after step 408. At step 308, the execution controller 108 sets any new generic locks that were obtained by the data lock log (at step 306, depicted in FIG. 3, for example). Step 308 of the method 300 optionally also comprises merging any new generic locks set at the step with any other generic locks previously set by the method 300 and associated with, for example, the ongoing process involving the first user and the first application 104.

In one embodiment, the method 300 accommodates the possibility that not all users may be using the first application 104 to access the services of the second application 112. For example, there may be a second user who directly initiates an instance of the second application 112 without using the first application 104 and the execution controller 108. In such a scenario, the second user may undesirably bypass the generic locking behavior provided by the method 300. For example, in one embodiment, it is the execution controller 108 which attempts to set a generic lock at step 308, and if such an attempt is denied because another user already has some type of exclusive lock on the data involved, the execution controller 108 will alert the first user. However, if a second user directly accesses the second application 112, the execution controller 108 will not provide the generic locking behavior for the second user, and will thus also not be able to deny the first user a generic lock if the second user has set an exclusive lock on to the data by directly accessing the second application 112. To accommodate this scenario, one embodiment of the method 300 provides a checksum functionality to attempt to determine if data has been modified by bypassing the generic locking behavior.

For every service request with a fixed position within a series of service requests, providing the same input data should return the same output data. If for a subsequent service request, the same output data is not returned for the same input data, the service is either not deterministic or data has changed and the second application 112 is working on outdated data. Thus, in one embodiment, the execution controller 108 creates a unique checksum, using an algorithm, for every service response. In one embodiment, the execution controller 108 uses a hashvalue algorithm to create the unique checksum. For example, an MD5 hashvalue algorithm, which has a fairly acceptable collision probability, can be used to generate the checksum. The algorithm is used to generate a checksum based on the input and output data, relative to the execution controller 108, related to the service request 408. If the series of service requests 408 is re-executed, the execution controller 108 compares the stored checksum for every service request 408 with the newly calculated one. If both checksums are equal, the execution controller 108 assumes that no data was changed in the meantime. If both checksums are not equal, data has changed. As all services are effectively stateless, the data has to be changed on the database 116 and the user is working with outdated data. The execution controller 108 is able to identify the service and its position within the series of services and raise a corresponding message to the first application 104 or the first user. The first application 104 can ask the first user to re-read data, continue anyway or cancel the first application 104.

Figure 6:
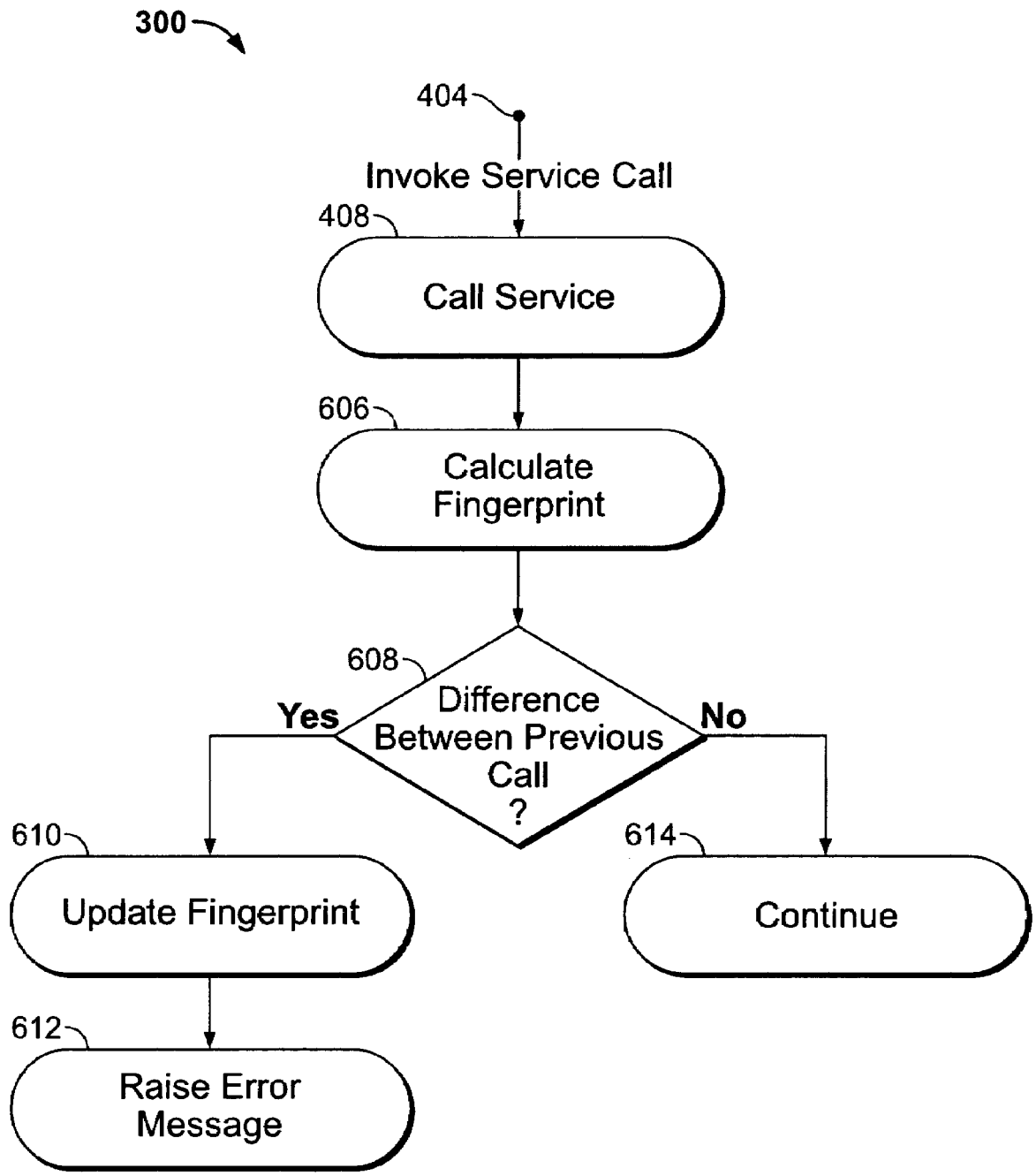
FIG. 6 is a flow chart depicting a schematic representation of at least part of one embodiment of the method depicted in FIG. 3, the embodiment of the method depicted in FIG. 6 including a hashing functionality.

FIG. 6 depicts one scenario involving at least part of an embodiment of the method 300 in which the method 300 includes the checksum functionality. The embodiment of the part of the method 300 depicted in FIG. 6 may overlap parts of the embodiment of the method 300 depicted in FIG. 3, and provide more detail in some aspects. As depicted in FIG. 6, at step 404 a service from the second application 112 is invoked 404 by the first application 104. The depicted embodiment of the method 300 proceeds to step 408 after step 404. At step 408, the service is requested 408 from the second application 112 by the execution controller 108. The depicted embodiment of the method 300 proceeds to step 606 after step 408. At step 606, the checksum based on the input and output data related to the service is calculated. The depicted embodiment of the method 300 proceeds to step 608 after step 606. At step 608, the method 300 determines if there is a difference between the checksum of the just-requested performance of the service in relation to the requested performance of the service most immediately-previous to the just-requested performance. If the determination is positive, the depicted embodiment of the method 300 proceeds to step 610 after step 608. At step 610, the method 300 updates the checksum of the just-requested service. The depicted embodiment of the method 300 proceeds to step 612 after step 610. At step 612, the execution controller 108 raises an error message to the first user indicating that the checksum has changed. If the determination is negative at step 608, the depicted embodiment of the method 300 proceeds to step 614. At step 614, the method 300 continues without raising an error message, for example allowing the first user to continue with the ongoing process in the first application 104.

In one embodiment, the software 100 comprises computer program instructions, which when executed by the processor 208, enable the performance of the method 300. For example, the computer program instructions of the software 100 optionally enable the automatic performance of the method 300. In one embodiment, the software 100 comprises computer program instructions, which when executed by the processor 208, and receive input from a user such as a human operator, enable the performance of the method 300. For example, the computer program instructions of the software 100 optionally provide a human operator with the ability to manage and provide input to the performance of the method 300. In one embodiment, a computer readable medium comprises the computer program instructions of the software 100, which when executed by the processor 208, enable the performance of the method 300. In one embodiment, a system comprises means to perform each of the steps of the method 300. For example, in one embodiment, the means to perform each of the steps of the method 300 comprise elements of the computing environment 200.

Further embodiments are also possible, which are the result of variously combining steps, elements or embodiments described herein. For example, further embodiments may comprise an altered order of the steps of the method 300 described herein, the result of which may be an embodiment particularly suited to a specific purpose or implementation. In another example, embodiments of the method 300 may include or exclude optional steps. Further embodiments, which would be discernable based on the disclosure of the present Application, are also possible.

What is claimed is:

1. A method, comprising:
   receiving by a first application an input from a user;
   performing a first service by a second application on the input received by the first application;
   obtaining a log of all data locks set by the second application while performing the first service, wherein the log indicates a data lock object and a data lock argument for each data lock set by the second application; and
   setting a generic lock having an associated generic lock object and a generic lock argument, wherein the generic lock argument indicates the data lock object and the data lock argument of at least one data lock set by the second application,
   wherein the generic lock is set after performance of the first service by the second application and before a performance of a second service by the second application, the generic lock remaining set until after the performance of at least the second service by the second application, such that the generic lock remains set during a time period between the performance of the first and second services by the second application during which the second application is not executing.

2. The method of claim 1, wherein the first application is associated with a first session and the second application is associated with a second session, the first session comprising a first communication link to a database, the second session comprising a second communication link to the database, the second communication link being a different communication link than the first communication link, the first and second sessions being associated with the user.

3. The method of claim 1, further comprising:
   invoking, by the first application through an execution controller, the first service from the second application;
   enabling, by the execution controller, tracking of the data locks set by the second application, wherein the enabling is in response to the invoking; and
   requesting, by the execution controller, the first service from the second application, wherein the requesting is in response to the invoking and performed after the enabling,
   wherein the setting of the generic lock is by the execution controller, and
   wherein the first application and the execution controller are associated with a first session, and the second application is associated with a second session.

4. The method of claim 1, further comprising:
   setting at least one data lock by the second application;
   executing a plurality of commands by the second application to perform the first service;
   returning, by the second application, a result of the performed first service, wherein the result includes output data; and
   deleting the at least one set data lock.

5. The method of claim 1, wherein the setting of the generic lock is indicated in a memory accessible by all instances of the first application associated with any session, the memory comprising a random access memory.

6. The method of claim 1,
   wherein the data lock is an exclusive data lock associated with the user, the exclusive lock granting write access to specific data for the user, the exclusive lock preventing other users from being granted write access to the specific data;
   wherein the generic lock is an optimistic lock associated with the user, the optimistic lock granting a non-exclusive reservation on write access to the specific data for the user, the optimistic lock not preventing other users from being granted other non-exclusive reservations on write access to the specific data;
   wherein the optimistic lock is capable of being converted to an exclusive lock, the converting comprising canceling any other optimistic locks on the specific data by other users.

7. The method of claim 6, wherein the second application is not capable of setting optimistic locks, the method thereby associating optimistic locking behavior with the services performed by the second application.

8. The method of claim 6, wherein the first application and the generic lock are associated with a first session, the second application and the data lock are associated with a second session, the first and second sessions being associated with the user, the second session ending before the first session,
   the method further comprising:
   deleting the data lock before deleting the generic data lock; and
   setting a second data lock before deleting the generic data lock, the second data lock being set by an instance of the second application associated with a third session, the third session being associated with the user.

9. The method of claim 3, wherein the second application is used in an effectively stateless manner, the effectively stateless manner comprising:
   initiating the second application in response to the invoking of the first service by the first application; and
   terminating the second application before invoking any other services from the second application by the first application.

10. The method of claim 3, further comprising:
    generating, by the execution controller, a checksum based on the input received by the first application and an output generated by performing the first service by the second application;

associating the checksum with the first service and storing the associated checksum;

invoking the second service by the first application, and performing the service second by the second application;

generating, by the execution controller, a second checksum based on the input and output associated with the invoking and performing of the second service; and comparing the second checksum to the first checksum.

11. A computer readable storage medium comprising computer instructions, which when executed by a processor perform a method, the method comprising:

receiving by a first application an input from a user;

performing a first service by a second application on the input received by the first application;

obtaining a log of all data locks set by the second application while performing the first service, wherein the log indicates a data lock object and a data lock argument for each data lock set by the second application; and setting a generic lock having an associated generic lock object and a generic lock argument, wherein the generic lock argument indicates the data lock object and the data lock argument of at least one data lock set by the second application, wherein the generic lock is set after performance of a first service by the second application and before a performance of a second service by the second application, the generic lock remaining set until after the performance of at least the second service by the second application, such that the generic lock remains set during a time period between the performances of the first and second services by the second application during which the second application is not executing.

12. The computer readable storage medium of claim 11, wherein the first application is associated with a first session and the second application is associated with a second session, the first session comprising a first communication link to a database, the second session comprising a second communication link to the database, the second communication link being a different communication link than the first communication link, the first and second sessions being associated with the user.

13. The computer readable storage medium of claim 11, the method further comprising:

invoking, by the first application through an execution controller, the first service from the second application;

enabling, by the execution controller, tracking of the data locks set by the second application, wherein the enabling is in response to the invoking; and requesting, by the execution controller, the first service from the second application, wherein the requesting is in response to the invoking and performed after the enabling, wherein the setting of the generic lock is by the execution controller, and wherein the first application and the execution controller run in a first session, and the second application runs in a second session.

14. The computer readable storage medium of claim 11, the method further comprising:

setting at least one data lock by the second application;

executing a plurality of commands by the second application to perform the first service;

returning, by the second application, a result of the performed first service, wherein the result includes output data; and deleting the at least one set data lock.

15. The computer readable storage medium of claim 11, wherein the setting of the generic lock is indicated in a memory accessible by all instances of the first application associated with any session, the memory comprising a random access memory.

16. The computer readable storage medium of claim 11, wherein the data lock is an exclusive data lock associated with the user, the exclusive lock granting write access to specific data for the user, the exclusive lock preventing other users from being granted write access to the specific data;

wherein the generic lock is an optimistic lock associated with the user, the optimistic lock granting a non-exclusive reservation on write access to the specific data for the user, the optimistic lock not preventing other users from being granted other non-exclusive reservations on write access to the specific data;

wherein the optimistic lock is capable of being converted to an exclusive lock, the converting comprising canceling any other optimistic locks on the specific data by other users.

17. The computer readable storage medium of claim 16, wherein the second application is not capable of setting optimistic locks, the method thereby associating optimistic locking behavior with the service performed by the second application.

18. The computer readable storage medium of claim 17, wherein the first application and the generic lock are associated with a first session, the second application and the data lock are associated with a second session, the first and second sessions being associated with the user, the second session ending before the first session, the method further comprising:

deleting the data lock before deleting the generic data lock; and setting a second data lock before deleting the generic data lock, the second data lock being set by an instance of the second application associated with a third session, the third session being associated with the user.

19. The computer readable storage medium of claim 13, wherein the second application is used in an effectively stateless manner, the effectively stateless manner comprising:

initiating the second application in response to the invoking of the first service by the first application; and terminating the second application before invoking any other services from the second application by the first application.

20. The computer readable storage medium of claim 13, further comprising:

generating, by the execution controller, a checksum based on the input received by the first application and an output generated by performing the first service by the second application;

associating the checksum with the first service and storing the associated checksum;

invoking the second service by the first application, and performing the service second by the second application;

generating, by the execution controller, a second checksum based on the input and output associated with the invoking and performing of the second service; and comparing the second checksum to the first checksum.

21. The method of claim 1, wherein the generic lock is set by an execution controller to prohibit other users and applications that access the database through the execution controller, other than the user using the first application to invoke the second application, from being granted write access to data indicated by the at least one data lock obtained from the log.

22. The method of claim 21, further comprising:
receiving a plurality of inputs at the first application from the user;
performing a plurality of services by the second application based on the plurality of inputs; and
setting the generic lock during a time period between the performing of individual services of the plurality of services during which the second application does not execute.

23. The method of claim 1, further comprising: performing the first and second services by the second application, each service accessing a database without accessing the database through an execution controller, the services first and second being temporally displaced from each other such that the second application only executes intermittently and does not execute in time periods between performing the first and second services;
wherein the setting of the generic lock is by the execution controller, the generic lock preventing a different user of the first application and any user of a third application that accesses the database through the execution controller from being granted write access to the data indicated by at least one logged data lock indicating the data lock object and data lock argument.

24. A method, comprising:
receiving a plurality of inputs from a user at a first application;
communicating a plurality of requests from the first application to an execution controller to request the execution controller to control a second application to perform a plurality of services based on the received inputs;
performing the plurality of services by the second application, each service accessing a database without accessing the database through an execution controller, the plurality of services being temporally displaced from each other such that the second application only executes intermittently and does not execute in time periods between performing individual services of the plurality of services;
obtaining a log of data locks set by the second application while performing the first of the services, the log including at least one logged data lock indicating corresponding data in the database that was locked by the second application to deny other applications write access to the data; and
setting a generic lock by the execution controller, the generic lock preventing a different user of the first application and any user of a third application that accesses the database through the execution controller from being granted write access to the data indicated by the at least one logged data lock,
wherein the generic lock is set after performance of a first of the plurality of services by the second application and before a performance of a second of the plurality of service by the second application, the generic lock remaining set until after the performance of at least the second of the plurality of service by the second application, that the generic lock remains set during a time period between the performances of the first and second of the plurality of services by the second application during which the second application is not executing.

\* \* \* \* \*